Aug. 30, 1960

T. T. JANNEY ET AL 2,950,741

PILE FABRIC

Filed Oct. 31, 1955

INVENTORS:
THOMAS T. JANNEY
ROBERT J. McCANN
BY Howson & Howson
ATTYS.

Aug. 30, 1960 — T. T. JANNEY ET AL — 2,950,741
PILE FABRIC
Filed Oct. 31, 1955 — 7 Sheets-Sheet 2

INVENTORS:
THOMAS T. JANNEY
ROBERT J. McCANN
BY Howson & Howson
ATTYS.

United States Patent Office 2,950,741
Patented Aug. 30, 1960

2,950,741

PILE FABRIC

Thomas T. Janney, Lafayette, and Robert J. McCann, North Wales, Pa., assignors to James Lees and Sons Company, Bridgeport, Pa., a corporation of Pennsylvania Filed Oct. 31, 1955, Ser. No. 543,896

3 Claims. (Cl. 139—404)

The present invention relates to pile fabrics and a method for producing the same, and more particularly to fabrics commonly known in the art as "one shot" fabrics having a single plane of weft in which a wire is inserted for each weft shot. The invention is especially applicable to pile fabrics such as rugs, carpets, and the like.

The conventional carpet fabrics are woven on shuttle looms in which a ground fabric is formed having upper and lower planes of wefts separated by a stuffer warp. The pile yarn is woven into the ground fabric by tying the pile tufts under either the upper or lower weft shots. Pile wires are normally inserted simultaneously with alternate shots, either upper or lower, and the characteristics of the pile surfaces are determined by the characteristics of the wires and the arrangement of the pile warps over the wires.

The conventional method of weaving requires frequent shutdowns for changing the shuttle or the bobbins in the shuttles when the supply of weft yarn is exhausted. The shut-downs decrease the production of the looms and require constant supervision by a weaver making it impossible for the weaver to operate more than one loom. The present invention eliminates the frequent shut-downs and thereby substantially increases the production of each loom. In addition to increasing the production of each loom, the present invention enables one weaver to operate two or more looms since the looms do not require the constant supervision necessary with conventional weaving.

A substantial weight of the conventional fabric is contained in the ground structure. This means that there is a large proportion of the warp and weft elements of the carpet which are hidden in the backing. While providing a more solid "feel" to the fabric, these hidden elements do not substantially increase the customer appeal but do increase the cost of the fabric. Not only is the cost increased because such a large portion of the carpet elements are in the ground structure, but it is increased by the extra operations required for the loom to produce the fabric. The present invention reduces the amount of hidden elements in the backing, and makes possible the production of a greater length of carpet for a given number of loom operations. Thus, the cost of the fabric is reduced not only by the savings in material, but also by the saving in loom operations and wages of the weavers in operating the loom.

The method of weaving the conventional fabric inherently causes streaks and directional effects when weaving fabrics having a pile surface of uniform color and height. The thickness of the ground fabric causes the pile projections to lie at a slight angle to the vertical and exhibits warpwise lines or streaks. This angular disposition of the pile projections produces a different degree of reflection of light when the carpet is viewed in different directions. This makes it difficult to match pieces of carpet when laying wall-to-wall carpets, thereby increasing the cost. This drawback is not as apparent in room size rugs, but the angular disposition of the pile projections causes the rugs to creep in the direction opposite to the direction of slope of the rug under the action of normal walking. The present invention substantially eliminates both the vertical directional effects and streaks, and the creeping occasioned by the angular disposition of the pile projections.

Another characteristic of conventional carpets is the relative ease with which the pile projections become dislodged from the backing. In cut pile fabrics, severe abrasion or repeated scuffing causes the tufts to pull out of the fabric and expose the backing. This is especially apparent where carpets are used under desks and swivel chairs where repeated movements may exert in a few months sufficient wear to pull out several adjacent tufts, thereby exposing a noticeable bare spot of the backing. In loop pile fabrics, the pile does not pull completely out of the fabric, but as a result of snags certain loops elongate at the expense of the adjacent loops, causing the latter to lie flat against the backing and exhibit a low spot in the pile surface. The latter problem is especially apparent in homes where pets are allowed to claw at the carpet. The present invention provides a carpet which exhibits superior tuft bind so that the pile is not so easily dislodged in the backing.

With the foregoing in mind, the present invention contemplates a novel pile fabric and method of weaving the same which provides a pile surface that is substantially uniform and non-directional.

A further object of the present invention is to provide a fabric which is characterized by a tuft bind that is superior to that of conventional fabrics.

A still further object of the present invention is to provide a method of weaving pile fabrics which provides the flexibility in design of the pile surface that is possible with the conventional Wilton and Velvet fabrics, and at the same time affording more economical production of the fabrics.

Another object of the present invention is to provide novel fabrics which are highly economical to produce, but which exhibit characteristics normally exhibited by the more expensive conventional carpet.

All of the objects of the invention, and the various features and details of the construction and operation thereof are more fully set forth hereinafter with reference to the accompanying drawings in which.

The novel fabric of the present invention is characterized by a series of double weft yarns disposed in a single plane. The double weft shots are interwoven with ground or chain warps which form a solid backing through which the pile yarns extend, thereby exposing the base of each pile tuft or loop so that they may be more securely bound in by the application of back sizing material without the use of additional pile yarn such as is required when a through to the back weave is produced by a conventional two weft plane carpet weave. The pile yarns form the pile surface by projecting upwardly intermediate adjacent pairs of double weft shots. In weaving the fabric according to the method of the present invention, a double weft shot is inserted, preferably by means of a needle, for each transverse pile wire that is inserted, and the pile surface is formed by passing the pile yarns either over or under the wires. After a series of pile wires has been inserted in the fabric, the leading wire of the series is withdrawn and inserted in the fabric shed at the trailing end of the series, as will be described more fully hereinafter. The pile wires may be either inserted simultaneously with the double weft shots or inserted independently between successive insertions of the double weft shots.

The double weft shots are disposed in a single plane by applying equal tension to the ground warps passing above and below the double weft shots. This is distinguished from carpet fabrics in which one of the ground warps, the stuffer warp, is under relatively high tension so that the shots inserted above and below the stuffer warp are disposed respectively in upper and lower planes.

Figure 1:
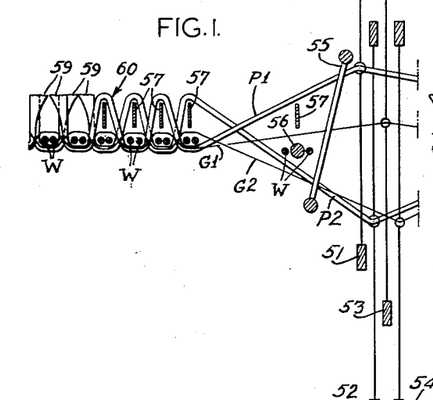
Figs. 1 and 2 are diagrammatic views of elements of a velvet loom showing steps in the weaving of a fabric made in accordance with the present invention.
Figure 2:
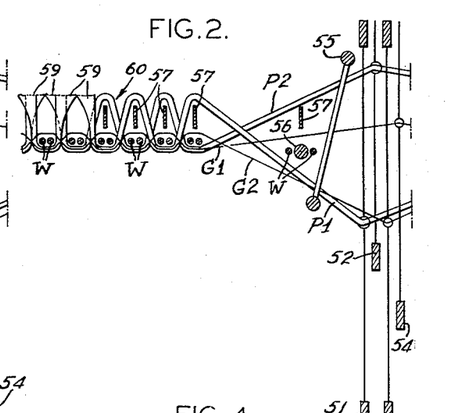

Referring now to the drawings, Figs. 1 and 2 thereof show the weaving of a fabric in accordance with the invention on a velvet loom. A typical velvet loom comprises four heddle frames or harnesses 51, 52, 53, and 54. The heddle frames 51 and 52 control the pile yarns of the fabric and are raised and lowered between upper and lower limit positions in opposition to one another by means of cams. The upper limit position of the pile harnesses dispose the pile yarns in an upper shed position and the lower limit position of the pile harnesses dispose the pile yarns in a lower shed position. The ground warp heddle frames 53 and 54 control the chain or ground warps of the fabric and are likewise movable in opposition to one another between upper and lower limit positions. The upper positions of the ground harnesses 53 and 54, however, dispose the chain warps in a middle shed position, and the lower limit position of the ground harnesses 53 and 54 dispose the chain warps in a lower shed position. Thus, as shown in Figs. 1 and 2, the heddle frames control the pile and ground warps to form a split shed. A reed 55 is positioned in front of the heddle frames 51, 52, 53, and 54 and the double weft shots are inserted by a needle 56 in front of the reed 55 in the lower portion of the split shed, a wire 57 being inserted in the upper portion of the split shed in front of the reed 55.

In the weaving of a fabric, the heddle 51 is positioned in its upper limit position, and the heddle 52 is in its lower limit position. Likewise, the heddle frame 53 is in its upper limit position and the heddle frame 54 is in its lower limit position. Thus, a split shed is formed with the pile yarn P1 in the upper shed position, the pile yarn P2 in the lower shed position, the ground warp G1 in the mid shed position and the ground warp G2 in the lower shed position. A pile wire 57 is then inserted in the upper portion of the shed and the needle 56 inserts, from one side of the loom to the other, a double weft shot W in the lower portion of the shed. The loop of the double weft shot W is threaded at the opposite side of the loom and the needle 56 is withdrawn. The reed 55 is rocked forwardly to drive the wire 57 and the double weft shot W up against the fell of the fabric, and then is rocked backwardly to the position shown in Figs. 1 and 2. During the beat-up of the reed, the heddle frames 51 and 52, and 53 and 54 reverse their positions, to the positions shown in Fig. 2. The leading wire of the series of wires 57 and in the fabric is then withdrawn and inserted into the upper portion of the shed between the pile yarn P2 and the ground warp G2, simultaneously with the insertion of another weft shot W by the needle 56. The double weft shot is threaded at the far end of the loom, and the needle is withdrawn, after which the reed 55 beats up the wire 57 and the weft shot W to the fell of the cloth. The positions of the heddle frames are then again reversed to the positions shown in Fig. 1. The cycle is then repeated. The wires 57 may be provided with knives which operate to cut the pile yarns woven over the wires to form tufts 59 in the finished fabric 60, as shown in Figs. 1 and 2.

The described sequence of operation of the loom forms a fabric in which the projections of the pile yarns P1 are formed over alternate wires 57 of a series, and the projections of a pile yarn P2 are formed over a intermediate wires of the series. The pile yarns are tied under the weft shots at each side of the wires over which they are formed. It is to be understood, however, that by changing the shape of the cams which control the heddle frames 51 and 52, or by applying a dobby motion to the heddle frames 51 and 52, it is possible to position the pile yarns selectively in the upper, middle, and lower shed positions in any desired sequence to thereby position the pile yarns over the wire, between the wire and the double weft shot, or under a double weft shot.

Figure 3:
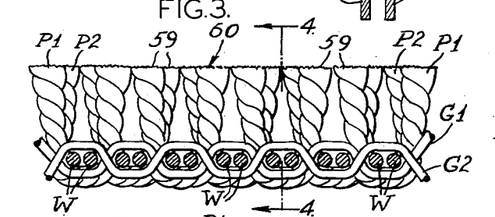
Fig. 3 is a warpwise sectional view of a fabric made as shown in Figs. 1 and 2.
Figure 4:
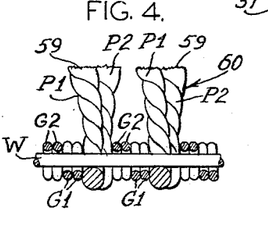
Fig. 4 is a sectional view on the line 4—4 of Fig. 3.
Figure 5:
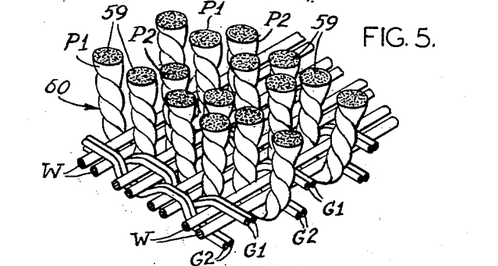
Fig. 5 is a perspective of the fabric shown in Fig. 3.
Figure 6:
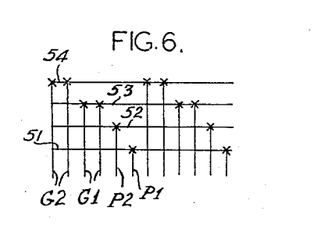
Fig. 6 is a diagram showing the draw of the pile and chain warps in the harnesses.
Figure 49:
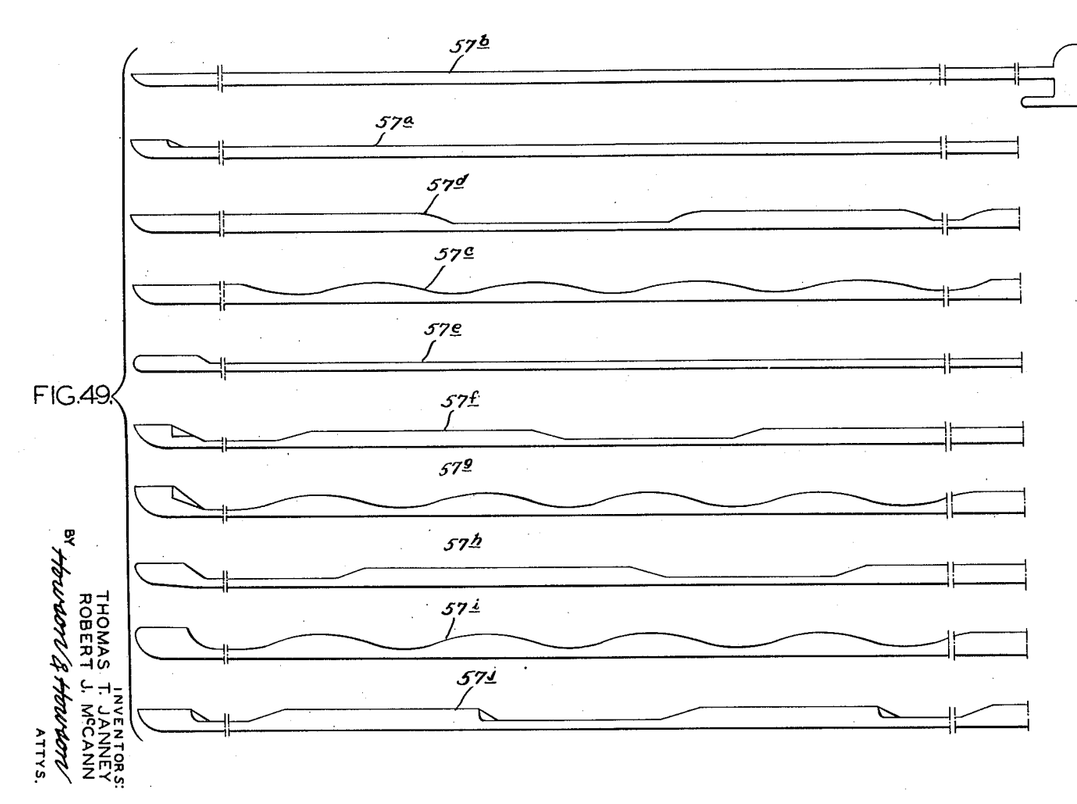
Fig. 49 is a view showing various types of wires which may be employed in weaving fabrics in accordance with the present invention.

Figs. 3 to 5 inclusive show the fabric 60 produced by the steps shown in Figs. 1 and 2 in which the wires 57 are cutting wires, for example as shown at 57a in Fig. 49, and in which the pile yarns P1 and P2 are disposed weftwise between the double chain warps which are drawn 2 x 2, in other words a weave in which (reading weftwise of the fabric) there are four ground warps, two pile warps, four ground warps, two pile warps, etc. This is shown clearly in the harness draw diagram of Fig. 6 wherein there are two ground warps G2 threaded through the heddle frame 54, two ground warps G1 threaded through the heddle frame 53, one pile yarn P2 threaded through the heddle frame 52, and one pile yarn P1 threaded through the heddle frame 51 in each dent of the reed. The drawings show the pile yarns P1 offset weftwise of the fabric, and overlapping warpwise of the fabric. However, those skilled in the art, understand that whether the pile yarns overlap or are offset, depends on the pitch of the weave (the number of reed dents in 27 inches of width), in combination with the number of wires or pile rows per inch warpwise of the weave. If a denser pile is required, a higher pitch may be used and the take-up of the loom may be adjusted to provide a greater number of wires per inch. In the alternative, more pile yarns may be threaded in each dent, for example, the harness 52 may be drawn with two pile yarns P2, and the harness 51 drawn with two pile yarns P1.

Figure 7:
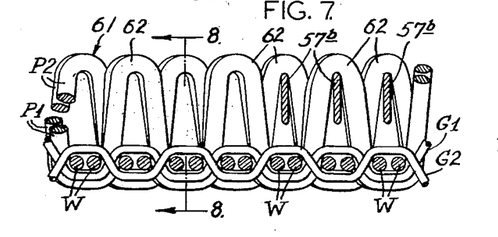
Figs. 7 to 10 inclusive are views similar to Figs. 3 to 6 showing another fabric made in accordance with the present invention.
Figure 8:
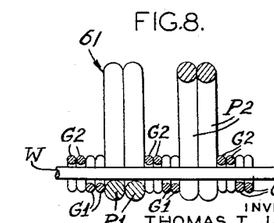
Figure 9:
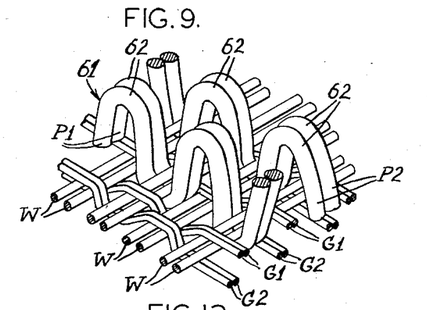
Figure 10:
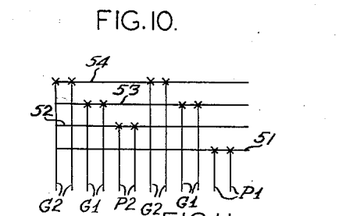

Figs. 7 to 9 illustrate another fabric 61 which may be produced by the method shown in Figs. 1 and 2. As shown in Fig. 10, the draw of the loom is such that in one dent, there are two ground yarns G2 in the harness 54, two ground yarns G1 in the harness 53, and two pile yarns P2 in the harness 52. In the adjacent dent, however, there are two ground yarns in the harness 54, two ground yarns G1 in the harness 53, and two pile yarns P1 in the harness 51. Thus, the pile yarns P1 and P2 are separated by chain or ground warp yarns. Otherwise, the fabric is the same except that round wires, for example as shown at 57b, are used in place of the cutting wires 57a, thereby producing a pile surface formed of loops 62 spanning alternate double weft shots W, instead of the tufted pile surface shown at 60 in Figs. 3 to 5.

Figure 11:
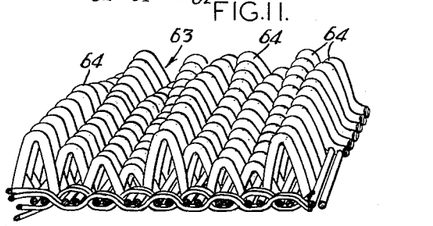
Fig. 11 is a perspective of a variation in the weave within the scope of the present invention.

Fig. 11 shows another variation in pile surface which is possible with the same steps in which serrated or wavy wires are employed, for example, as shown at 57c in Fig. 49. The fabric 63 is composed of pile loops 64 which span double weft shots and vary in height both warpwise and weftwise of the fabric.

Figure 12:
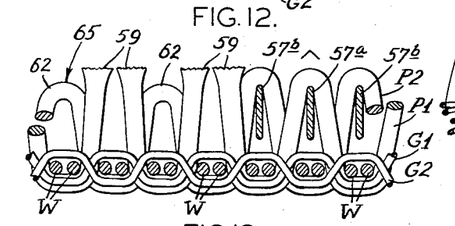
Fig. 12 is a view similar to Fig. 7 showing a variation in weave possible employing the combination of cut and round pile wires.

Fig. 12 is a warpwise sectional view of another fabric 65 in which cutting wires 57a are alternated with round wires 57b to produce a pile surface having both the loops 62 and tufts 59. Fig. 12 also indicates that loops of different heights may be employed by using wires of different height.

Figure 13:
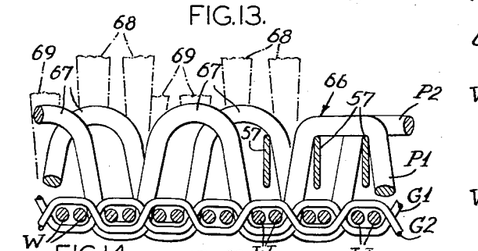
Fig. 13 is a view similar to Fig. 12 showing another variation in the weave, the uncut pile being shown in full lines, and the cut pile being shown in broken lines.

Fig. 13 is a warpwise sectional view of a fabric 66 which is produced by changing the motion of the harnesses 51 and 52. To form this weave, the harness 52, for example, is retained in the upper limit position for two weft insertions and dropped to the lower limit position for a third weft insertion, whereas the harness 51 is in its lower limit position for the first weft insertion and in its upper limit position for the two succeeding weft insertions. Thus, the pile yarns repeat on three wires, whereas the ground warp yarns repeat on two wires. The resulting fabric, as shown in Fig. 13 in full lines where round wires 57b are used, has pile loops 67 which span over two double weft shots and are tied under the third double weft shot. If cutting wires 57a are used, the fabric exhibits a textured tufted surface having both high and low tufts shown in broken lines at 68 and 69 respectively. This is occasioned by the cutting of the pile loops at one end of each span over the two wires.

Figure 14:
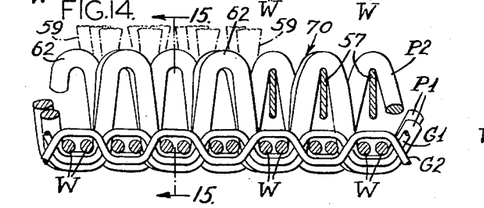
Fig. 14 is a view similar to Fig. 13 showing still another variation within the scope of the present invention.
Figure 15:
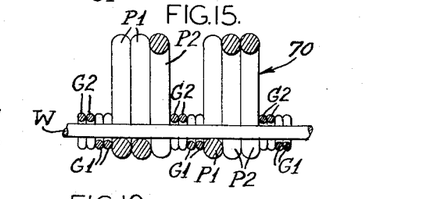
Fig. 15 is a sectional view on the line 15—15 of Fig. 14.
Figure 16:
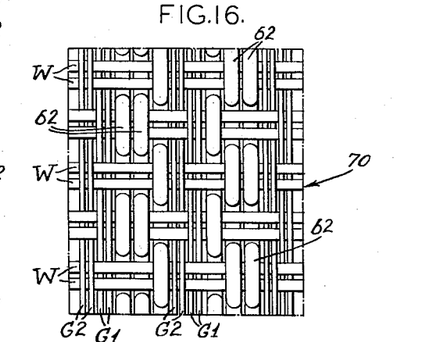
Fig. 16 is a diagrammatic plan of the fabric shown in Figs. 14 and 15.
Figure 17:
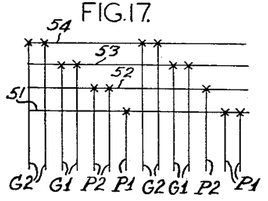
Fig. 17 is diagram showing the harness draw for the fabric shown in Figs. 14 to 16 inclusive.

Figs. 14 to 16 inclusive illustrate another variation in the weave which greatly reduces the warpwise and weftwise stripes normally apparent in fabrics having a uniform pile surface. The fabric 70 employs a loom having a harness motion as indicated in Figs. 1 and 2, but drawn as indicated in Fig. 17. It should be noted that the draw of the ground warps G1 and G2 is identical to those shown in Figs. 6 and 10. However, alternate dents are drawn with pile yarns P2 and one pile yarn P1 and the intermediate dents are drawn with one pile yarn P2 and two pile yarns P1. The resulting fabric may comprise tufts 59 or loops 62, reference being had to the Gebert Patent No. 2,708,457 for a more complete description of the novel effects obtained by this pile arrangement.

Figure 18:
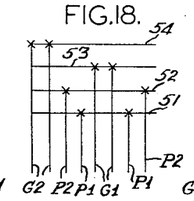
Figs. 18 and 19 are diagrams showing harness draws for effecting variations in the chain warp disposition within the scope of the present invention.
Figure 19:
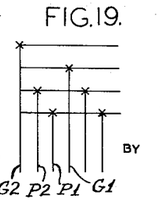

Fig. 18 illustrates another variation in the draw. In this instance, the ground warps G2 and G1 are separated by pile warps P2 and P1. The warps G2 may be in one dent and the warps G1 in an adjacent dent. In this case, the pile warps P1 and P2 are transposed in adjacent dents. Of course, if a denser weave is desired, the draw may be in a single dent. Fig. 19 illustrates another draw in which the ground warps G1 and G2 are drawn singly and are separated by the two pile warps P2 and P1. We have not attempted to exhaust the possibilities of variations available by different harness draws, but have merely indicated that a wide variety of weaves is possible by simply changing the harness draw.

Figure 20:
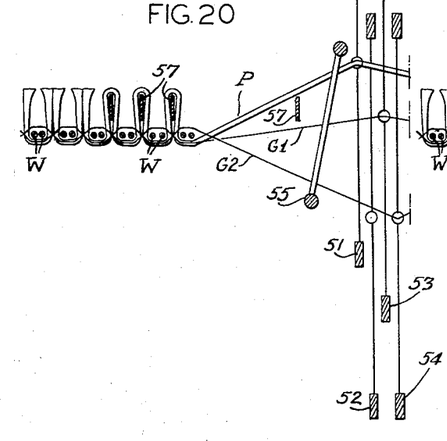
Figs. 20 and 21 are diagrammatic views similar to Figs. 1 and 2 showing another variation of the present invention.
Figure 21:
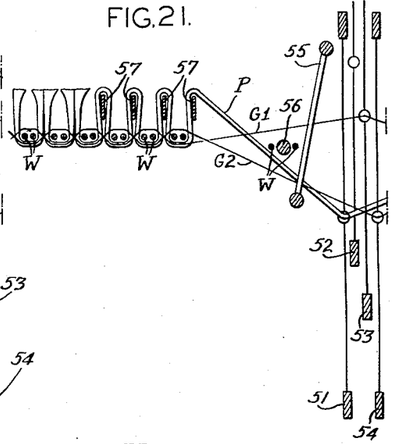

The foregoing description has pertained to wire-on-shot velvet weaving, but the present invention is equally applicable to wire-between-shot weaving. Wire-between-shot weaving requires a different timing of the loom. The elements of the loom are the same, but the drive for the needle 56 and the wire 57 is such that the wire is inserted alone in one shed, and the needle 56 is inserted alone in the succeeding shed. A beat up of the reed 55 occurs between each shed formation. Since a weft is inserted in only the alternate sheds, the motion for harnesses 53 and 54 controlling the ground warp yarns is modified so that the latter harnesses shift only after alternate sheds. As shown in Figs. 20 and 21, the harness 52 is not drawn with any pile yarns, so that all of the pile yarns are drawn through the harness 51. Thus, in the arrangement shown in Figs. 20 to 24, all of the pile yarns are raised over each wire and are tied in under each weft.

Figure 22:
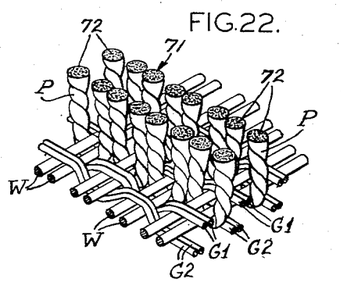
Figs. 22 to 24 inclusive are perspectives of fabrics produced in accordance with the method shown in Figs. 20 and 21.
Figure 23:
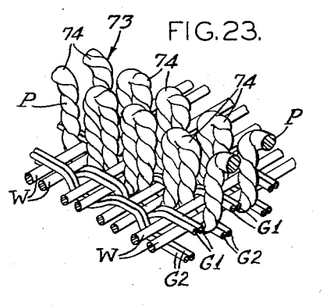
Figure 24:
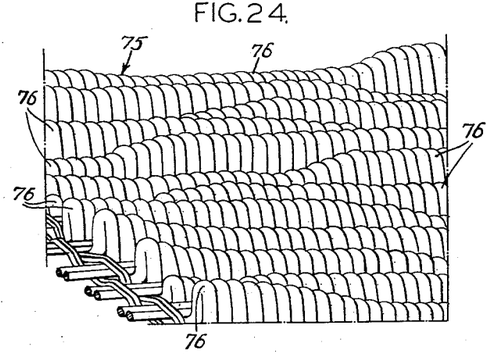
Figure 25:
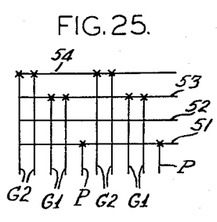
Fig. 25 is a diagram showing the harness draw for the weaves shown in Figs. 22 to 24 inclusive.

Fig. 22 shows a fabric 71 formed over cutting wires 57a which form tufts 72 between the shots W. Fig. 23 shows a fabric 73 formed over round wires 57b which form loops 74 between the shots W. Fig. 24 shows a fabric 75 formed over serrated wires, for example, such as shown at 57d in Fig. 49 in which loops 76 vary in height both warpwise and weftwise of the fabric. Fig. 25 shows the draw which is similar to the draw shown in Fig. 6, except that the harness 52 is drawn blank.

Figure 26:
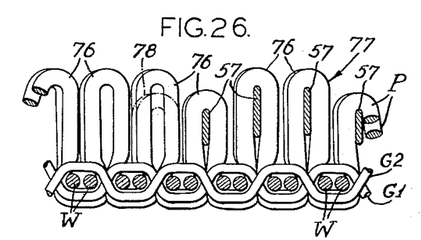
Figs. 26 and 27 are warpwise sectional views in adjacent dents of another fabric made in accordance with the present invention.
Figure 27:
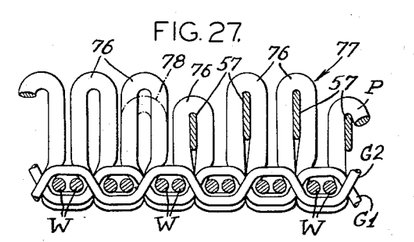
Figure 28:
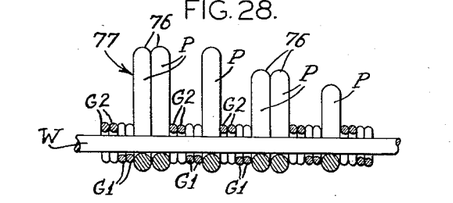
Fig. 28 is a weftwise sectional view of the fabric shown in Figs. 26 and 27.
Figure 29:
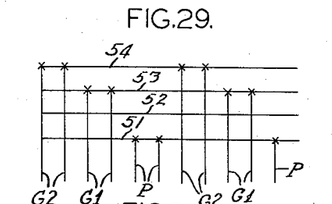
Fig. 29 is a diagram of the harness draw for the weave shown in Figs. 26 to 28 inclusive.

Figs. 26 to 28 show a wire-between-shot fabric 77 having loops 76 of varying height, and exhibiting characteristics similar to those exhibited by the fabric shown in Figs. 14 to 16. As shown in Fig. 29, the harness 52 is drawn blank, but to provide a variation in density in adjacent dents, the harness 51 is drawn with one pile warp in alternate dents, and two pile warps in the intermediate dents. The transverse wires employed in weaving the illustrated weave are serrated wires, and to this end, it is noted that withdrawal of the wires causes the loop drawing indicated by the broken lines at 78 in Figs. 26 and 27.

Figure 30:
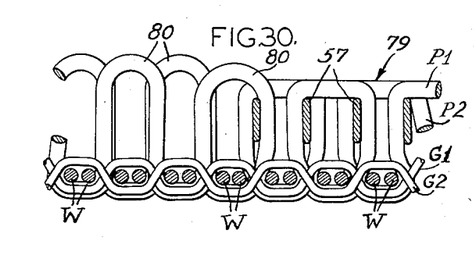
Fig. 30 is a warpwise sectional view showing another weave in accordance with the present invention.
Figure 31:
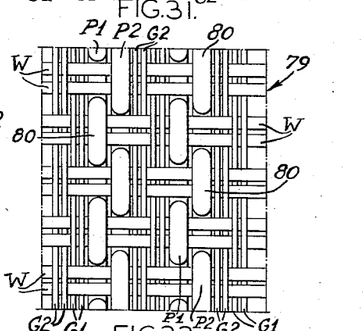
Fig. 31 is a plan of the weave shown in Fig. 30.
Figures 32, 33, 34, 35:
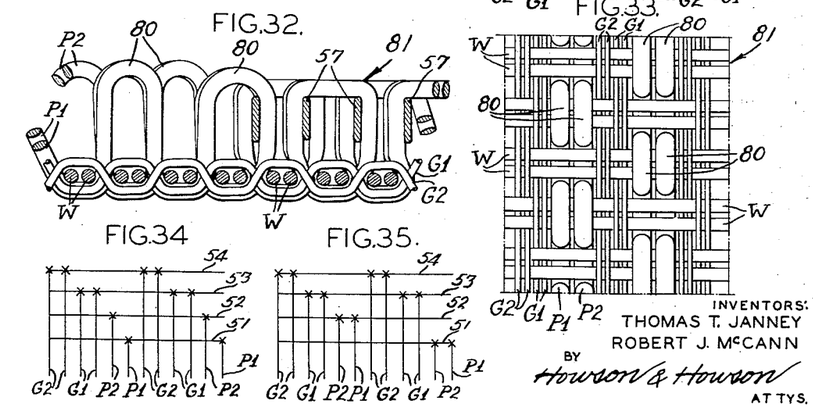
Fig. 32 is a sectional view of another weave in accordance with the invention.
Fig. 33 is a plan of the weave shown in Fig. 32.
Figs. 34 and 35 are the diagrams of the draws for the weaves shown in Figs. 30 and 32 respectively.

Figs. 30 and 31 illustrate a fabric 79 woven wire-between-shot with a variation in the timing of the harnesses. In this instance, both harnesses 51 and 52 are drawn with pile yarns, as indicated in Fig. 34 and the timing of the pile harnesses 51 and 52 is such that they are in their upper limit position for three sheds and are in their lower limit position for the fourth shed. The harness 51 disposes its pile yarns in the lower shed position during insertion of alternate double weft shots, and the harness 52 disposes its pile yarns in the lower shed position during the insertion of the intermediate weft shots; this produces in a wire-between-shot weave, loops 80 which span one weft shot which are formed over two wires. Figs. 32 and 33 show a fabric 81 having loops 80 similar to that shown in Figs. 30 and 31, but in which the draw is varied as indicated in Fig. 35. By using cutting wires instead of round wires, an effect similar to that shown in broken lines in Fig. 13 may be achieved.

We have described the wire-between-shot weaving with a 2 x 2 draw of the ground warps, but it is obvious that other draws of the ground warps may be used to produce a different base fabric. Likewise, as pointed out above, a dobby motion may be applied to the pile harnesses to obtain a different sequence of operation for the harnesses, or, if desired, the cams for the pile harnesses may be formed to dispose some of the pile warps under the wires to produce weaves substantially identical to those produced by the wire-on-shot method of weaving.

To provide selectivity in the pile pattern, it may be desired to use a Wilton loom. In a Wilton loom, the pile yarns are controlled by a jacquard mechanism, each end being controlled individually by a lingo heddle. The ground warp yarns are controlled by cam-actuated heddle frames or harnesses which operate like the harnesses of the Velvet loom.

Figures 36, 37, 38:
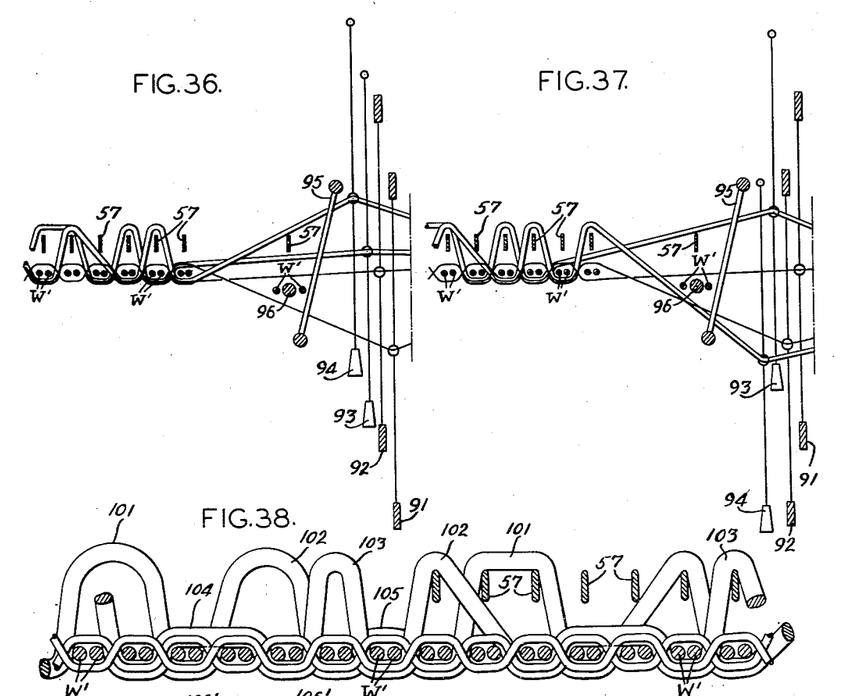
Figs. 36 and 37 are diagrammatic views of elements of a Wilton loom showing steps in the weaving a fabric in accordance with the present invention.
Figs. 38 to 40 inclusive are warpwise sectional views showing fabrics woven on a Wilton loom in accordance with the present invention.

Referring to Figs. 36 and 37, the heddle frames for controlling the ground warp yarns are indicated at 91 and 92, and two lingo heddles are shown at 93 and 94, respectively. The lingo heddles 93 and 94 are provided with eyes at their upper ends for attachment to the jacquard mechanism, and are weighted at their lower ends to insure proper operation. A reed is provided at 95 and a needle at 96, the pile wire being shown at 57. The needle inserts weft yarns W', and the sequence of operation is substantially the same as that described in connection with Figs. 1 and 2. The jacquard mechanism for controlling the lingo heddles 93 and 94 is capable of positioning the pile yarns selectively in the upper shed, mid shed, or lower shed position to thereby cause the pile yarns to be woven over the wire, between the wire and the double weft shots, or under the double weft shots.

When weaving the wire-on-shot fabric, shown in Figs. 36 and 37, it is preferred to use a so-called three-position jacquard which may be a traditional modified rise and fall jacquard having fixed knives or griff for retaining selected ends in the middle position, movable knives or griff for raising other selected ends to upper position, and a movable grate for dropping the rejected ends to the lower shed position. Of course, other jacquards may be employed which afford selection of the pile warps between the upper, middle and lower shed positions, and if it is not desired to position the pile warps intermediate the wires and the double weft shots, a single lift jacquard may be used. There are many jacquards suitable for weaving Wilton fabrics and we have not attempted to illustrate or describe any specific type.

Figure 39:
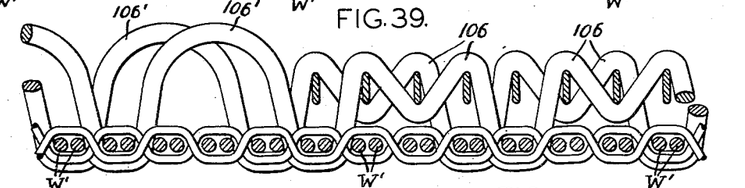

The jacquards when used on Wilton looms afford a wide selectivity in the formation of the pile surface of the fabric. Fig. 38 shows a combination of various types of pile projections. A high float which floats over two wires and two double weft shots is shown at 101; an intermediate float which floats over one wire and two weft shots is shown at 102; a normal wire-on-shot pile loop is shown at 103; a low float over two double weft shots is shown at 104; and a pile warp passing over one double weft shot is shown at 105. Fig. 39 shows the formation of an extra high float 106 over three weft shots in which the pile warp is woven over a wire, under the succeeding wire, and over the next succeeding wire before it is tied into the ground fabric. This method of weaving forms a high float 106' which is substantially higher than the high float which is woven over three wires between successive ties in the ground fabric (not shown herein).

Figure 40:
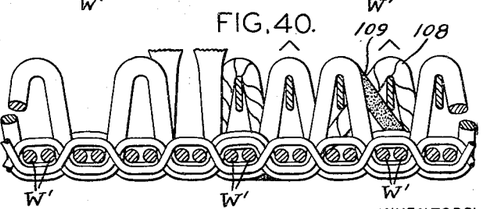
Figure 41:
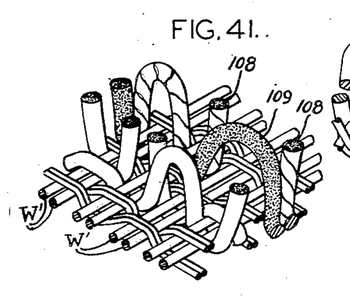
Fig. 41 is a perspective of the fabric shown in Fig. 40.

Further variations in pile surface may be obtained by using alternating cutting and round wires, as indicated in Fig. 40. By using both cutting and round wires, it is possible to provide a fabric with both cut and loop pile surface, and by forming intermediate floats over two weft shots, one float being over a cutting wire and an adjacent float being over the non-cutting wire, it is possible to produce both cut and loop pile in the same weftwise row, for example as shown at 108 and 109 in Fig. 41.

Figures 42, 43, 44:
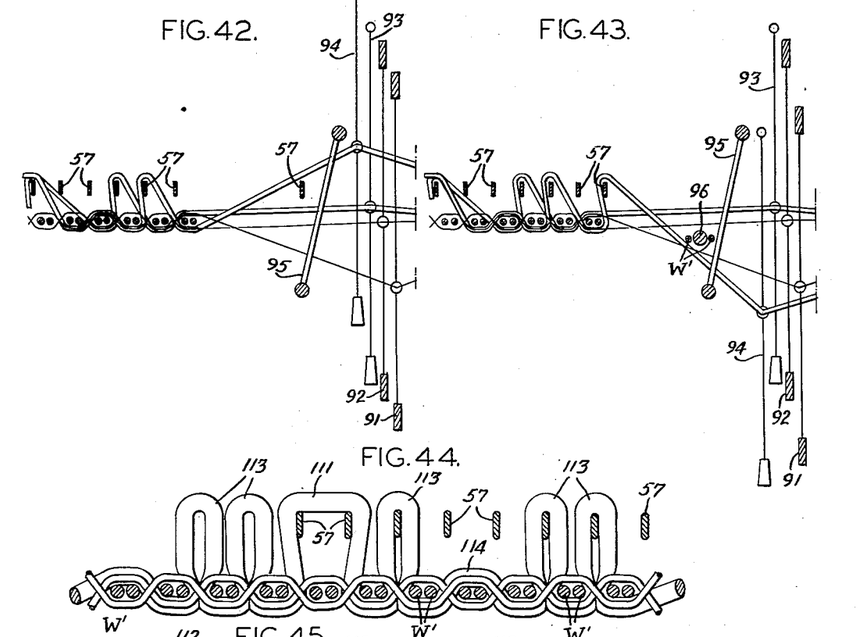
Figs. 42 and 43 are views similar to Figs. 36 and 37 showing another mode of weaving in accordance with the invention on a Wilton loom.
Figs. 44 to 47 are warpwise sectional views of fabrics within the scope of the present invention.

Figs. 42 and 43 show the weaving of a wire-between-shot weave on a Wilton loom. In this instance, the wire 57 is inserted in one shed, and the needle 96 inserts the double weft shot W' in the succeeding shed, and the harnesses 91 and 92 controlling the ground warps are changed in their timing to reverse on alternate sheds instead of every shed as in Figs. 36 and 37. This method of weaving is especially adapted for employing a modified jacquard in which selection is made between middle and upper shed positions in alternate sheds, and between lower and middle positions in intermediate sheds. However, any suitable jacquard mechanism may be employed.

Figure 45:
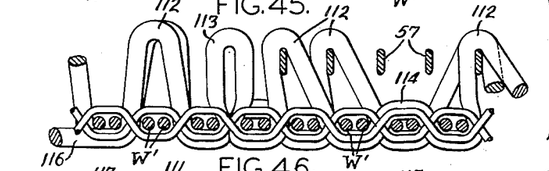
Figure 46:
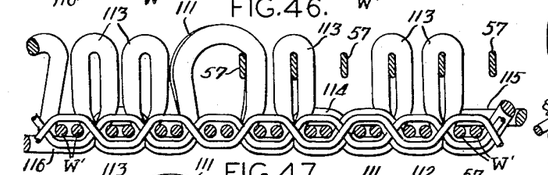
Figure 47:
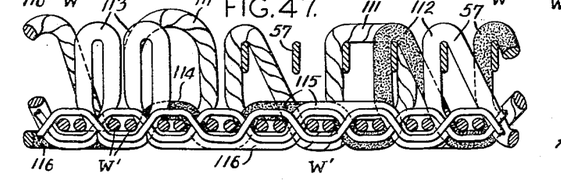
Figure 48:
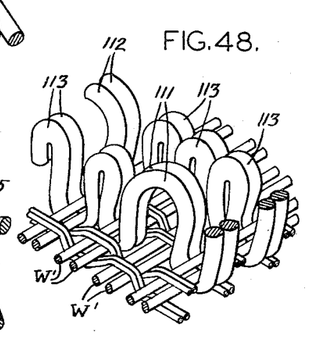
Fig. 48 is a perspective of the fabric shown in Fig. 46.

Figs. 44 to 47 show various pile formations within the scope of the present invention. It should be noted that there are high floats over two wires and one double weft shot, indicated at 111; intermediate floats over one wire and one double weft shot indicated at 112; normal pile loops indicated at 113; low face floats over one double weft shot indicated at 114; low face floats over a plurality of double weft shots indicated at 115; and on-the-back floats under a plurality of double weft shots indicated at 116. Fig. 44 shows a single frame fabric in which only one pile warp is contained in each dent; Figs. 45 and 46 show two frame fabrics in which two pile warps are disposed in each dent; and Fig. 47 discloses a three frame fabric having three pile warps in each dent.

In addition to the various pile formations shown in the drawings, it is possible to obtain other pile effects by employing pile wires having different characteristics. Fig. 49 shows various types of pile wires which may be used. 57a is a cutting wire, 57b a round wire, 57c and 57d are different types of serrated or wavy wires, all of which have been discussed above in connection with the velvet weave. In addition, it is possible to use a nub wire, for example, as shown at 57e which produces a fabric similar to that described in the Shuttleworth Patent No. 2,164,090. Serrated wires with cutters on the ends may be used as shown at 57f and 57g or serrated wires with spoons on the end as indicated at 57h and 57i which produce slightly different pile characteristics or a wavy wire having knives along its length, as indicated at 57j and described in the Smiley Patent No. 2,674,270, may be employed. The carpet designer may use wires of one characteristic throughout the fabric or may arrange the wires in many interesting sequences to produce varied pile effects. Of course, other pile effects may be employed by using wires of different height in various arrangements in the wire set, as will be apparent to the skillful carpet designer.

In addition to the various pile characteristics obtained by the proper selection of wires, many interesting pile characteristics may be obtained by employing different yarns. For example, synthetic yarns may be planted with natural yarns to provide cross-dyed effects, or hard twist yarns may be used with soft twist yarns. In addition, it is possible to vary the tension on the individual pile yarns. Fancy yarns may also be used, such as nub yarns, slub yarns, pull-down yarns, bulking yarns, stretch yarns, etc.

Regardless of the type of yarn used for the arrangement of the wires in the wire set, the fabric is characterized by a single plane of double weft shots in which the pile surface projects out of the plane of the double weft shots, the individual pile projections comprising the pile surface being tied under selected double weft shots. In weaving the fabric, a transverse pile wire is inserted into a shed for each needle insertion of a double weft shot.

The fabric has many of the desirable characteristics of the conventional double weft plane carpet fabrics, but eliminates the stripes and directional effects apparent in the conventional fabric. The method of producing the fabric insures highly economical production, eliminating many of the expensive operations inherent in the production of conventional carpet fabrics, and produces a fabric which is highly satisfactory in construction and use.

It is noted that the pile yarns in passing below the weft shots are exposed on the back of the fabric. Thus, when finishing the fabric by applying a suitable settable back size, the setting of the back size not only firmly anchors the pile projections in the ground fabric and effectively prevents pulling of the pile in normal usage, but also provides a tuft bind which is superior to that of conventional fabrics. In addition to the improved tuft bind, the fabric exhibits characteristics of the more expensive conventional fabrics in which the pile coloring appears on the back.

As used in the foregoing description, the term "float" refers to and means a pile yarn which has not been bound into the backing or ground fabric in accordance with the sequence normally employed for binding that yarn into such backing or ground fabric.

While selected embodiments of the invention have been herein illustrated and described, we have not exhausted the possibilities, and changes and modifications may be made within the scope of the disclosure without departure from the invention, as defined in the appended claims.

We claim:

1. In the manufacture of a one shot carpet having ground warps, pile warps, and double weft shots, the method of weaving said carpet which comprises forming a pile wire shed by raising at least one of said pile warps to an upper shed position, inserting a transverse pile wire into said pile wire shed, beating up said wire to the fell of the carpet, forming a ground fabric shed by disposing one portion of the ground warps in a lower shed position, and the remaining portion of the ground warps above said lower shed position, inserting a double weft shot into said ground fabric shed, beating up said shot to the fell of the carpet, forming a second pile wire shed by raising at least one of the pile warps to an upper shed position, inserting a pile wire into said shed, beating up said wire to the fell of the carpet, forming a second ground fabric shed by disposing said remaining portion of said ground warps in the lower shed position and disposing said one portion of the ground warps in a position above said lower shed position, inserting a double weft shot in said second ground fabric shed, and beating up said shot to the fell of the carpet.

2. The method of weaving a one-shot pile carpet fabric in accordance with claim 1 in which certain of the pile warps disposed in the upper shed position are maintained in said position for at least two successive pile wire insertions.

3. The method of weaving a one-shot pile carpet fabric in accordance with claim 1 in which certain of the pile warps disposed in the upper shed position are maintained in said position over one wire and a subsequent weft shot.

References Cited in the file of this patent

UNITED STATES PATENTS

| 2,141,152 | Kaufman | Dec. 20, 1938 |
| 2,578,173 | Clark | Dec. 11, 1951 |
| 2,649,862 | Harding | Aug. 25, 1953 |
| 2,655,951 | Clark | Oct. 20, 1953 |
| 2,708,457 | Gebert | May 17, 1955 |
| 2,714,400 | Harding | Aug. 2, 1955 |
| 2,715,918 | Eisler et al. | Aug. 23, 1955 |
| 2,718,243 | Matthews | Sept. 20, 1955 |
| 2,760,528 | McKnight et al. | Aug. 28, 1956 |
| 2,774,389 | Hoeselbarth | Dec. 18, 1956 |

FOREIGN PATENTS

| 12,482 | Great Britain | of 1907 |
| 469,013 | Great Britain | July 14, 1937 |